United States Patent [19]

Egorov et al.

[11] 4,193,824

[45] Mar. 18, 1980

[54] METHOD FOR MANUFACTURING STEEL SPRING LEAVES

[76] Inventors: Viktor P. Egorov, Vostryakovsky proezd, 11, korpus 1, kv. 226; Viktor A. Ognevsky, Sumskoi proezd, 15, korpus 2, kv. 279; Anatoly G. Orlovsky, Avtozavodskaya ulitsa, 7, kv. 81; Grigory A. Ostrovsky, Raketny bulvar, 10, kv. 47; Alexandr M. Ryskind, Kirovogradskaya ulitsa, 24, korpus 1, kv. 161; Anatoly L. Stepin, Birjuleveskaya ulitsa, 5, korpus 2, kv. 347; Oleg F. Trofimov, Chusovskaya ulitsa 11, korpus 8, kv. 92; Isaak N. Shklyarov, Velozavodskaya ulitsa 9, kv. 24, all of Moscow, U.S.S.R.

[21] Appl. No.: 824,211

[22] Filed: Aug. 9, 1977

[30] Foreign Application Priority Data

Aug. 18, 1976 [SU] U.S.S.R. .............................. 2385501
Aug. 18, 1976 [SU] U.S.S.R. .............................. 2385502

[51] Int. Cl.² .............................................. C21D 7/14
[52] U.S. Cl. ................................. 148/12.4; 148/39; 148/143; 148/146; 148/150; 148/152
[58] Field of Search ............... 148/150, 152, 143, 146, 148/39, 12.4

[56] References Cited

U.S. PATENT DOCUMENTS 3,466,202 9/1969 Hrusovsky ........................... 148/150

Primary Examiner—R. Dean

[57] ABSTRACT

The present invention relates to a method and apparatus for manufacturing steel spring leaves. The method comprises the steps of induction heating of each steel spring leaf, its hardening by bending, cooling and, finally, tempering. Cooling its performed with subsequent self-tempering, after which the spring leaf is surface-hardened to a depth of 0.1-th to 0.3-th part of its gauge with the aid of induction heating. The apparatus for carrying the method into effect incorporates successively arranged entry guide rollers with an inductor in-between, bending rollers, a cooler and exit guide rollers. An additional inductor with cooler is provided between the exit guide rollers to enable surface-hardening of spring leaves. The cooler, additional inductor with cooler and the exit guide rollers are arranged along a circular arc whose radius is that of a specified radius of curvature of the spring leaf. The proposed method enhances the strength of spring leaves and thus reduces the weight of springs.

3 Claims, 3 Drawing Figures

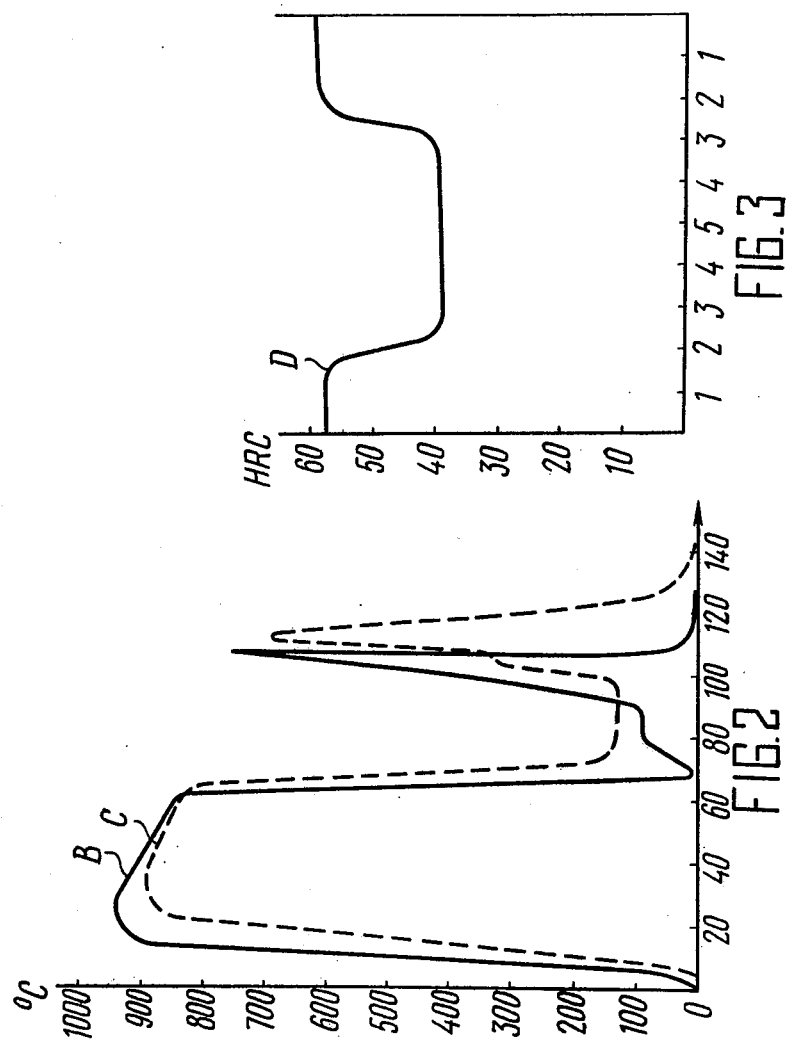

METHOD FOR MANUFACTURING STEEL SPRING LEAVES

BACKGROUND OF THE INVENTION

1. Field of the Invention

The present invention relates to machine-building, and more particularly, to methods and apparatus for manufacturing steel spring leaves.

The present invention can be used to advantage in the manufacture of springs intended for transport means.

The invention is also suitable for application in the manufacture of leaf-type articles which undergo severe fatigue stresses in service.

2. Description of the Prior Art

There is known in the art a method for manufacturing steel spring leaves, which consists in a succession of the following process operations: induction heating of each spring leaf, its bending, cooling and tempering.

Induction heating of each spring leaf to hardening temperature is effected in an oval-shaped inductor wherein the leaves are stacked. During heating, leaves are moved inside the inductor in stacks, after which each heated leaf is transferred to a die for bending. Next, each leaf is hardened by cooling in oil, then tempered separately.

Springs manufactured in accordance with the prior-art method feature adequate strength in ordinary service. However, the mass of a spring is high and, in addition, the manufacture of said springs calls for a substantial consumption of metal.

The realization of the aforesaid method makes its automation very complicated. Automation of the method requires relatively large floorspace and a numerous servicing personnel.

There is also known an apparatus for manufacturing steel springs which comprises arranged in succession entry guide rollers, bending rollers and exit guide rollers. The bending rollers are set in pairs in a manner to accommodate spring leaves therebetween. The known apparatus also incorporates an inductor with cooler wherein a spring leaf is hardened after bending.

The cooler in the known device is located directly back of the inductor so that bending is effected on a short length of the spring leaf close in value to the inductor width. Bending of spring leaves throughout their length in the known device requires welding to each spring leaf of an auxiliary leaf pre-cambered to a specified radius since, a straight leaf cannot pass through the apparatus due to specific design of the latter. Leaves are passed through the known apparatus as described above, whereupon, after bending and heat treatment, the pre-cambered leaf is cut off.

The aforesaid apparatus ensures the manufacture of spring leaves by the above-described method.

However, the known apparatus is insufficiently productive due to the necessity for welding an auxiliary leaf (see, e.g., "Premyshlennoye primeneniye tokov vysokoi chastoti v elektrotermii".

The principal object of the invention is to provide a method and apparatus for manufacturing steel spring leaves, which makes it possible to reduce the mass of a spring while retaining a high strength thereof.

Still another no less important object of the invention is to provide a method and apparatus for manufacturing steel spring leaves, which insures enhanced production efficiency in terms of output of springs.

A further object of the invention is to provide a method and apparatus for manufacturing steel spring leaves, which will reduce the requirements in floorspace.

These and other objects are accomplished by the provision of a method for manufacturing steel spring leaves, comprising the steps of induction heating to hardening temperature of each spring leaf, its bending, hardening by cooling, and tempering; in accordance with the invention each spring leaf is cooled in a manner to achieve tempering, whereupon the leaf is surface-hardened to a depth between about 0.1 th to about $0.3^{th}$ part of spring leaf gauge at least on one of its sides by means of surface induction heating.

This enhances the fatigue strength of the spring leaf being treated and thus provides a possibility for reducing the mass of springs due to the following two factors, namely: creation of residual compressive stresses and formation of a surface layer possessing high strength due to fine-grained structure.

It is common knowledge that residual compressive stresses, when added up with working tensile stresses, reduce the magnitude of the latter and thus enhance the strength of spring leaves in cyclic loadings.

Surface hardening, accomplished after self-tempering, gives rise to a layer of martensite of a particularly fine-grained structure. The resultant martensite structure carrying no structurally-free ferrite makes it possible to obtain, in subsequent surface hardening, particularly fine-grained austenite whose place is filled after cooling by martensite with grains measuring 1 to 3 $\mu$m. This type of structure features a high strength and plasticity.

It is expedient that the cooling of each spring leaf be effected by jets of a fluid medium followed by self-tempering to a surface temperature of each spring leaf from about 100° C. and to about 500° C. during a period of time necessary to attain a difference between the temperatures of the core of each spring leaf and its surfaces of about 30° C. to about 100° C.

Due to jet cooling with self-tempering, spring leaves may be quenched by water instead of oil as in the prior-art method. It has been experimentally prooved that in jet cooling combined with self-tempering, the use of water for quenching causes no cracks.

In addition, water quenching eliminates the need for flushing of leaves, which is imperative after oil quenching.

Moreover, self-tempering at the expense of heating that precedes surface-hardening lowers the consumption of electric power.

As the difference in the temperatures of the core and of surfaces of spring leaves prior to surface heating ranges from 30° to 100° C., the core of spring leaf is tempered during surface induction heating at sufficiently high temperatures required for provision of high residual compressive stresses in surface layers of spring leaves.

It is good practice to direct jets of a fluid at an angle to the surface of spring leaves of about 20° to about 60°, and to introduce additional jets of a fluid upon the surface of spring leaves at angle of about 160° to about 120° into the stream of said medium on the surface of spring leaves formed by the initially supplied jets.

In case jets are directed only at an angle of between about 20° and about 60°, there is formed a stream that spreads over the leaf, the latter undergoing in this case nonuniform cooling.

Provision of additional jets in a direction opposite to the initial ones at angle of 160° to 120° to the surface of leaves gives rise to a stream that blocks the stream formed by the initial jets.

The effect is a cooling zone that is stabilized, well-defined and adjustable through the spacing of the points of introduction of both streams.

The restruction of the cooling zone stabilizes self-tempering conditions and makes it possible to obtain in surface induction heating a hardened layer of a constant depth throughout the length of each spring leaf.

It is expedient that in an apparatus for accomplishing the proposed method, comprising successively arranged entry live rollers, bending rollers set in pairs for accommodating a spring sheet in-between, exit guide rollers, an inductor with cooler, in accordance with the invention, the inductor be arranged between the entry live guide rollers, and the cooler, between the bending and the exit guide rollers, and additionally be provided an inductor with cooler arranged-intermediate the exit guide rollers and intended for effecting surface-hardening of spring leaves; the cooler, the additional inductor with cooler and the exit guide rollers being arranged along a circular arc whose radius is equal to that of a specified radius of curvature of a spring leaf.

Such apparatus makes it possible to bend to a specified radius of curvature relatively short spring leaves without having to weld onto them pre-cambered spring leaves and to carry the proposed method into effect, which enhances the strength of spring leaves and thus reduces the mass of springs.

It is good practice to provide stops between the entry live guide rollers and the bending rollers and between the adjacent pairs of bending rollers at a distance from the surface of each leaf as it passes between the said rollers of about 0.0001-th to about 0.00005-th part of a specified radius of curvature of each spring leaf.

Said stops and their arrangement make it possible to bend to a specified radius of curvature the whole of a leaf, inclusive of its ends.

The use of the herein proposed method and apparatus for manufacturing steel spring leaves, makes it possible to reduce the mass of springs while retaining their adequate strength.

The invention enhances the productivity in spring leaf manufacture and facilitates the automation of all the constituent operations.

In addition, the method and apparatus of the invention bring down the requirements in floorspace and improve working conditions of attending personnel.

BRIEF DESCRIPTION OF DRAWINGS

The preferred embodiment of the invention will now be described by way of example, with reference to the accompanying drawings, in which:

FIG. 2 represents schematically a diagram of the variation of temperatures of surface of a spring leaf and its core depending upon the time of effecting the proposed method, wherein the time is plotted in seconds along the X-axis, and the temperature, in degrees Centigrade, along the Y-axis.

FIG. 3 represents schematically diagram of the variation of hardness across each spring leaf, wherein plotted along the X-axis is the distance from the surface in mm, and along the Y-axis, the hardness in HRC units.

Figure 1:
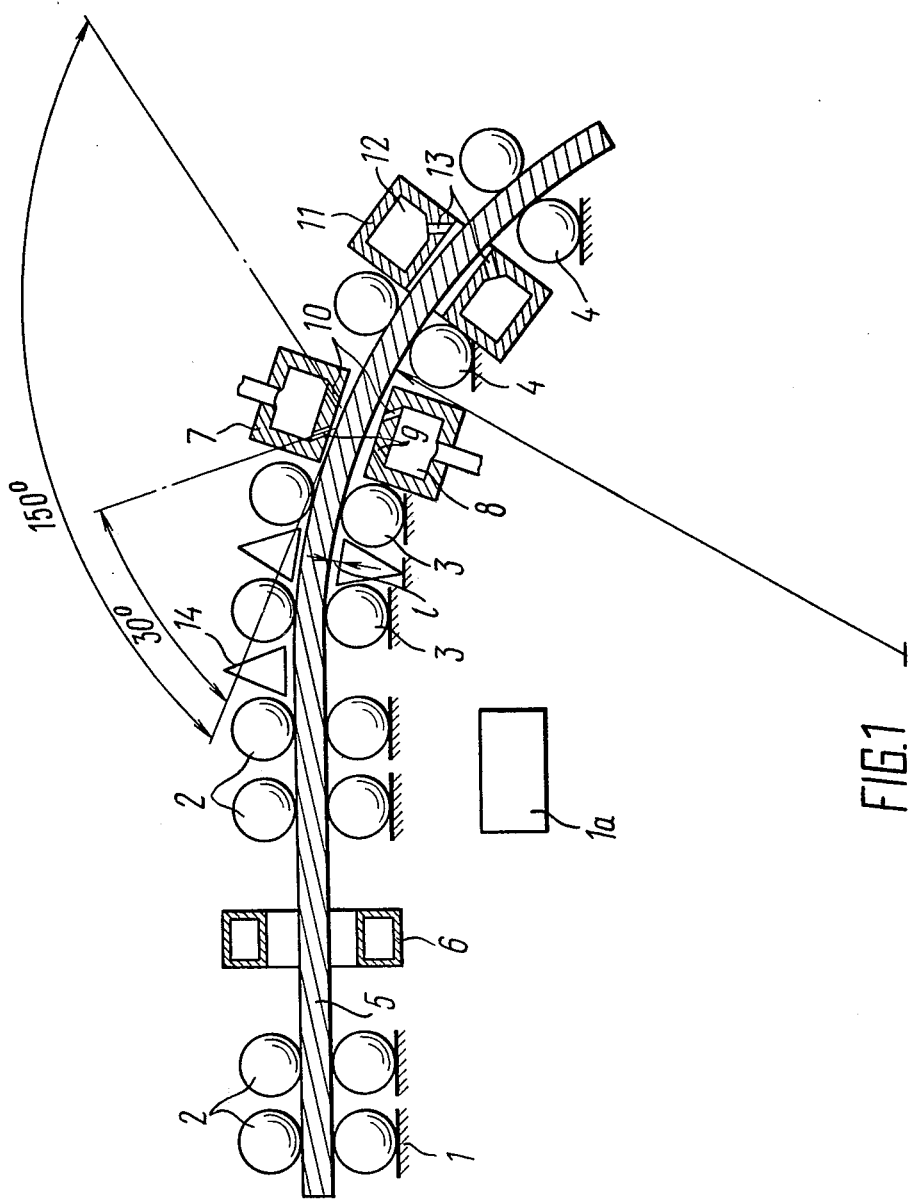
FIG. 1 is a schematic longitudinal sectional view of an apparatus for manufacturing spring leaves in accordance with the invention.

The proposed method will become more apparent from the following description of the apparatus of the invention and its functioning.

DESCRIPTION OF THE PREFERRED EMBODIMENT

The apparatus with particular reference to FIG. 1, basically comprises, arranged in succession on a support 1, entry guide rollers 2, bending rollers 3 and exit guide rollers 4. The support 1 carries a means of any suitable design for actuating the rollers 2. The rollers 2, 3, 4 are placed in pairs to accommodate a spring leaf 5 advancing therebetween. The proposed apparatus number four pairs of the entry guide rollers 2, one roller 2 of each pair being located or arrange one side of the spring leaf 5, and the other roller 2 of said pair, on the other side of the spring leaf 5. Incorporated in the apparatus are two pairs of the bending rollers 3 and two pairs of the exit guide rollers 4 located or arranged with respect to the leaf 5 in a manner simular to that of the above mentioned pairs of the rollers 2. In alternative embodiments, rollers 3 and 4 may be live.

The proposed apparatus comprises an inductor 6 intended for heating the spring leaf 5 prior to hardening. The inductor 6 is placed or arranged between two pairs of the entry guide rollers 2 and secured on the support 1.

The inductor 6 may be of any known design suitable for the purpose and is therefore not herein described for the sake of clarity of the invention. The inductor 6 is electrically connected to a power source (not shown). The inductor 6 is arranged so as to permit a spring leaf 5 to pass therethrough.

The apparatus of the invention incorporates a cooler 7 also mounted on the support 1 and connected to a fluid source (not shown). The cooler 7 is located or arranged intermediate the bending rollers 3 and the exit guide rollers 4. The cooler 7 has an annular cavity 8 to receive a fluid therein and nozzles 9, 10 adapted to direct jets of fluid upon the surface of the spring leaf 5. The axes of the nozzles 9 and 10 are oriented respectively at an angle of 30° and of 150° to the surface of the spring leaf 5.

The nozzles 9, 10 are arranged so as to preclude intersection of their geometric axes before the surface of the spring leaf 5.

The herein described apparatus incorporates an additional inductor made integrally with a cooler 11 and adapted to enable surface-hardening of the spring leaf 5. The inductor with the cooler 11 is mounted on the support 1 and located or arranged intermediate pairs of the exit guide rollers 4. The inductor is electrically connected to a power source (not shown). The inductor with the cooler 11 is arranged so as to permit the spring leaf 5 to pass therethrough. The inductor with the cooler 11 is provided with an annular cavity 12 connected to a fluid source (not shown).

Geometric axes of the nozzles 13 which serve to supply a fluid to the surfaces of the spring leaf 5, are arranged at an angle of 30° with respect to the surface of the spring leaf 5.

The cooler 7, additional inductor with the cooler 11 and exit guide rollers 4 are arranged or located along a circular arc whose radius R is equal to that of a specified radius of curvature of the spring leaf 5.

The proposed apparatus is provided with stops 14 mounted on the support 1 and intended for bending the ends of each spring leaf 5 to a specified radius R.

One stop 14 is arranged or placed intermediate the entry guide rollers 2 and bending rollers 4. Two stops 14 are located intermediate adjacent pairs of the bending rollers 3. The distance 1 from the stops 14 to the surface of each spring leaf 5, as it passes in-between the rollers 2, 3, is 0.0008-th part of a specified radius R of curvature of each spring leaf 5. This distance may vary within the range of from about 0.0001-th to about 0.00005-th part of a specified radius R of curvature of each spring leaf 5.

Such distance value provides a required radius of bending the ends of the spring leaf 5 to a high degree of accuracy, which ensures a specified radius of curvature of spring leaves throughout their lengths. After the ends of the spring leaf 5 have passed by the stops 14 have no contact with the spring leaf 5.

The proposed method for manufacturing steel spring leaves and operation of the apparatus for effecting same are carried out in accordance with the invention in a manner below.

The spring leaf 5 is advanced between the entry guide rollers 2 rotatable by a driving means 1a. The leaf 5 is placed between the rollers 2 of each pair. The rollers 2 are then urged to move the leaf 5 into the inductor 6 wherein the surface of the leaf 5 is heated to a temperature of about 950° C. as shown by curve B in FIG. 2; the core of the leaf 5 is heated to a temperature of about 900° C., as shown by curve C.

The heated portions of the spring leaf 5 are transferred from the inductor 6 into the pairs of the guide rollers 2 downstream of said inductor. The heated end of the spring leaf 5 comes into contact with the stop 14 and slightly bends, whereupon the leaf 5 is moved so as to be arranged or located between the rollers 3. The rollers 3 and the stops 14, the latter being arranged in-between said rollers and along a circular arc whose radius R equals a specified radius R of curvature spring leaf, cause bending of the leaf 5 to a specified value. In the process, the surface and the core of the spring leaf 5 are cooled to a temperature of approximately 800° C., as shown on FIG. 2. The leaf 5 is then passed through the cooler 7 into whose cavity a fluid is introduced in jets via the nozzles 9 and 10 at an angles of 30° and 150°, respectively, protected to the surface of the spring leaf 5. This results in substantially rapid cooling of the leaf 5 in the cooler 7, as shown by curves B and C, to a temperature of approximately 20° C. on the surface of the leaf 5, and to a temperature of approximately 150° C. in its core. After cooling, the leaf 5 is advanced to be placed between the exit guide rollers 4.

Self-tempering of the leaf 5 takes place along the section intermediate the cooler 7 and the inductor with the cooler 11, with the effect that the temperature of the surface of the leaf 5 rises to about 100° C., and the temperature of its core drops to approximately 130° C., which is also shown by curves B and C. The leaf surface may be heated during self-tempering to a temperature ranging from about 100° C. to about 550° C., while the difference in the temperatures of cores and of surfaces of each spring leaf may vary within the range of from about 30° C. to about 100° C.

Next, the spring leaf 5 enters the additional inductor with the cooler 11 whose cavity 12 is supplied with a fluid.

In the additional inductor with cooler 11, the surface of the leaf 5 is heated by the inductor, then cooled by the fluid introduced via the nozzles 13 upon its surface from the cavity 12.

Heating of a spring leaf is effected at a rapid rate. Its surface is heated to a temperature of about 800° C., and its core, to a temperature of approximately 700° C., as shown by curve B and C, respectively, in FIG. 2. This results in surface hardening of the leaf to a depth of about 0.2-th part of the spring leaf gauge. Leaves may also be hardened to a depth of about 0.1-th to about 0.3-th part of the spring leaf gauge.

In carrying out the method of the invention, spring leaves are passed through the apparatus for effecting same one by one to undergo in succession all the above-described operations which comprise the method.

Upon hardening, the spring 5 is moved out through the exit guide rollers 4 for subsequent tempering. The leaf 5 is forced out of the apparatus by the effort of the succeeding leaf which passes through the entry live guide rollers 2. Tempering is effected at a temperature of about 250° C. by any conventional means not herein shown or described for the sake of clarity of the invention.

The proposed method makes it possible to ensure a distribution of hardness across the spring leaf 5, shown by curve D in FIG. 3. The hardness of the leaf surface layer amounts to 58 HRC, and that of the core, to 38 HRC units. In addition, the surface-hardened layer causes high residual compressive stresses on the leaf surface due to a larger volume of the high-hardness martensite.

Thus, the surface layer of a spring leaf manufactured according to the proposed features a greater resistance to cyclic loads by virtue of two factors, namely residual compressive stresses and greater strength of martensite.

In large gauge spring leaves, core hardness may be lowered by an additional tempering at a temperature of 450° to 600° C. prior to surface heating.

Spring leaves which were manufactured by the proposed method showed a far greater strength than that of leaves produced by the prior-art method.

Spring leaves were assembled into a spring and tested in accordance with a program simulating the loading of a truck moving along a road paved with broken stone. Springs assembled of the leaves manufactured according to the proposed method have withstood 7200 km without failure, whereas those assembled of leaves manufactured by the prior art method, a mere 4600 km.

Thus, the proposed method made it possible to raise by almost 1.5 times the durability of springs. With service life of springs manufactured by the known method and the proposed one being equal the proposed method makes it possible to reduce the mass of a truck spring by approximately 10 kg.

What is claimed is:

1. A method of manufacturing spring leaves, comprising the successive steps of: heating each spring leaf by induction heating to a hardening temperature; bending each heated spring leaf; cooling each spring leaf to ensure hardening with subsequent self-tempering; hardening the surface of each spring leaf to a depth of about one tenth to about three tenths part of its gauge on at least one of its sides, by surface induction heating.

2. A method as claimed in claim 1, including the steps of: cooling of each spring leaf by subjecting each spring leaf to jets of fluid and self-tempering each spring leaf at their surfaces to a temperature from about 100° C. to about 500° C., said self-tempering occuring during a time necessary to achieve a difference in the temperatures of a core of each spring leaf and of its surfaces equal to that of about 30° C. to about 100° C.

3. A method as claimed in claim 2, including the steps of: projecting jets of a fluid medium upon the surface of spring leaves at an angle of about 20° to about 60° and supplying additional jets of a fluid medium for impingement upon surfaces of said spring leaves at and angle of about 160° to about 120° into the stream of said medium on the surfaces of spring leaves.

* * * * *